D. G. SPENCER.
VEHICLE RUNNING GEAR.
APPLICATION FILED DEC. 30, 1916.
1,234,813.
Patented July 31, 1917.
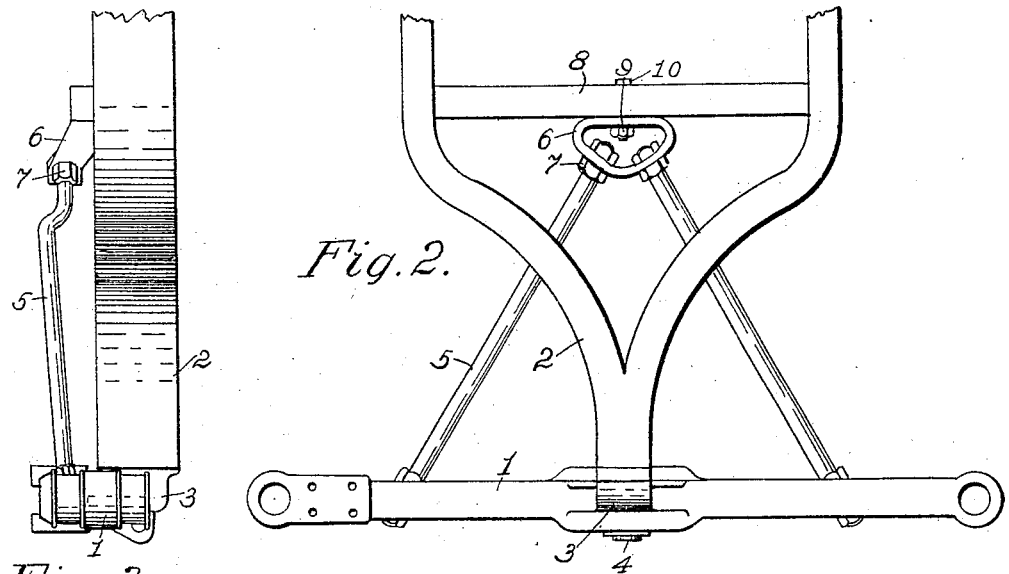
Fig. 2.
Fig. 3.
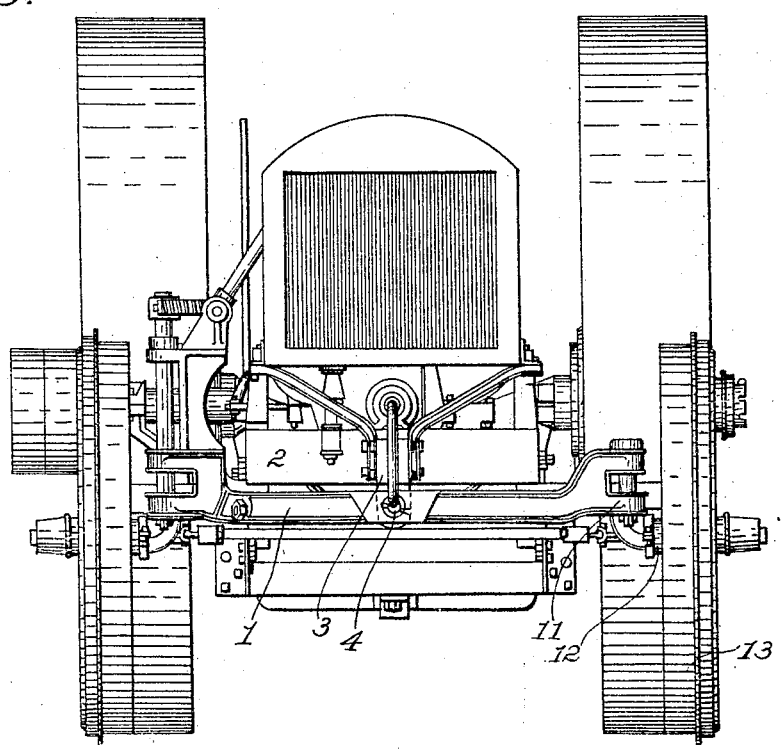
Fig. 1.
Inventor,
D. G. Spencer, by
G. C. Kennedy,
Attorney.

UNITED STATES PATENT OFFICE.

DANIEL G. SPENCER, OF WATERLOO, IOWA, ASSIGNOR TO INTER-STATE ENGINE & TRACTOR COMPANY, OF WATERLOO, IOWA.

VEHICLE RUNNING-GEAR.

1,234,813.  Specification of Letters Patent.  Patented July 31, 1917.

Application filed December 30, 1916. Serial No. 139,792.

*To all whom it may concern:*

Be it known that I, DANIEL G. SPENCER, a subject of the King of Great Britain, and a resident of Waterloo, Blackhawk county, Iowa, have invented certain new and useful Improvements in Vehicle Running-Gear, of which the following is a specification.

My invention relates to improvements in vehicle running gear, and the object of my improvement is to supply for power-driven devices of this class and particularly for tractors for agricultural or other use, an effective pivotal coupling means for supporting the vehicle frame on the steering-wheels, adapted to permit the steering-wheels to swing up and down to uninterruptedly follow the contour of the surface traversed. This object I have accomplished by the means which are hereinafter described and claimed, and which are illustrated in the accompanying drawings, in which:

Figure 1 is a front elevation of a tractor, embodying my improved pivotal connection for the steering-wheels; Fig. 2 is a detail fragmental plan view of the forward part of the tractor frame as pivotally mounted on the tiltable axle of the steering-wheels, and Fig. 3 is a fragmental detail in side elevation of the parts shown in Fig. 2.

Similar numerals of reference denote corresponding parts throughout the several views.

The numeral 1 denotes the tiltable axle of the forward steering wheels 13 of a tractor, the latter having knuckle-joint connections at 12 of a well-known type with the ends of said axle to permit the wheels to be rocked horizontally by means of steering-gear not shown.

The tractor-frame 2 is composed of bars bent to form a hollow rectangular structure positioned in a horizontal plane, and the side-bars are brought together at the front to meet conjunctively, in a rectangular prow 3 bent downwardly to enter a rectangular vertical longitudinal opening in the middle of the axle 1. This prow 3 is pivotally connected to the axle 1 by means of a heavy pintle 4, to permit the axle to rock up and down vertically relative to said frame, thus permitting like movements to the wheels 13, whereby they are enabled to follow the various rugations or variations of the surface traversed. The numeral 6 denotes a hollow triangular body pivotally mounted on the middle of a cross-beam 8 of said frame by a pivot-bolt 10 and securing-nut 9. Said body 6 is fixedly bracketed at transversely-spaced places on rearwardly and convergingly extending bars 5 mounted fixedly on the axle 1 near its ends, and secured by nuts 7. This connection steadies and supports the axle without detracting from its freedom of rocking movements, and prevents its rocking horizontally.

The rectangular downwardly turned prow 3, while permitting the axle 1 to rock thereon vertically, obviously prevents side play of the axle, and also permits the location of the axle 1 below the level of the rear axle which carries the large diameter traction-wheels, so that steering-wheels of much less diameter may be conveniently used, which much facilitates shifting them laterally while steering, and gives a rigid and strong connection at the pivotal point.

The triangular body 6 has its longer outer face in contact with said cross-beam 8, which prevents lateral rocking of said body and thus braces the bars 5 to better support the axle 1.

Having described my invention, what I claim as new, and desire to secure by Letters Patent, is:

1. In a vehicle, a forwardly diminished frame supported on carrying-wheels and steering-wheels and having a rigid cross-beam, an axle on which the steering-wheels are rotatably mounted, and a medial pivotal connection between said axle and the diminished part of said frame permitting the axle to rock vertically only, comprising a pivotal connection between the diminished forward end of said frame and the middle of said axle, a hollow triangular body having one face contacting with and pivoted medially on said frame to the rear of the axle, and brace-rods fixedly connected to the end parts of said axle, converged toward and secured to transversely separated places on said triangular body.

2. In a vehicle, a horizontal frame comprising rigidly connected side beams brought convergingly together at one end, connected rigidly and bent downwardly to form a depending rectangular prow, an axle having a medial longitudinal rectangular vertical opening in which the depending end of said prow is seated, a pintle mounted in said axle across said opening on which said prow is pivoted to permit vertical rocking movements of the axle, and steering wheels rotatably mounted on said axle.

Signed at Waterloo, Iowa, this 12th day of Dec. 1916.

DANIEL G. SPENCER.

Witnesses:
PEARL M. STANTON,
G. C. KENNEDY.

Copies of this patent may be obtained for five cents each, by addressing the "Commissioner of Patents, Washington, D. C."